Patented Nov. 4, 1930

1,780,334

UNITED STATES PATENT OFFICE

WALDO BRIGGS BURNETT AND IRA WILLIAMS, OF PITTSBURGH, PENNSYLVANIA, ASSIGNORS, BY MESNE ASSIGNMENTS, TO E. I. DU PONT DE NEMOURS & COMPANY, OF WILMINGTON, DELAWARE, A CORPORATION OF DELAWARE

ALDEHYDE AMINE CONDENSATION PRODUCTS

No Drawing.   Application filed February 12, 1926. Serial No. 87,956.

This invention relates to the production of certain novel condensation products of amines and aldehydes.

In our application No. 15,337 filed March 13, 1925, we have already disclosed the fact that one molecular proportion of an amine will react directly with a plurality of molecular proportions of an aldehyde under conditions whereby water is eliminated, and with the production of novel and useful condensation products.

We have now found that the speed of this condensation is greatly increased by the presence of an acid or a substance displaying acidic properties in contact with water. We have further found that the resulting products have properties which distinguish them from the corresponding aldehyde amine condensation products derived without the use of an acidic substance.

The chemical nature of this condensation as well as the chemical composition of the end products is not yet perfectly understood. The reaction is probably not a simple molecular one and several different chemical compounds are formed. One possible explanation is that the reaction products first formed combine with a further quantity of aldehyde to produce more complex bodies and by suitable reaction conditions the nature and the amount of the different reaction products can be controlled.

We have also found the presence of an excess of aldehyde during the condensation to be beneficial in many cases. For example we have found the condensation product obtained by condensing one molecular proportion of aniline with 3.5 molecular portions of n-butyraldehyde in the presence of an acidic substance to be a good accelerator of vulcanization. If by starting with one molecular proportion of aniline and five molecular proportions of n-butyraldehyde in the presence of an acidic substance, heating until 3.5 molecular proportions of n-butyraldehyde have been consumed, and distilling out the remaining 1.5 molecular proportions of free n-butyraldehyde, the resulting condensation product has considerably better accelerating properties than the products obtained by condensing directly one molecular proportion of aniline with 3.5 molecular proportions of n-butyraldehyde.

Our novel products vary in consistency from mobile to very viscous liquids and in some cases they are substantially non crystalline solids at ordinary temperatures. This is governed by the particular amine and aldehyde and by their relative proportions as well as by the particular condensing agent used and its amount.

The chemical behavior is in general quite similar and the differences between the products obtained by varying the amounts of the reacting substances, the condensing agent or the reacting conditions, are only of a gradual nature.

The chemical composition of the hydrocarbon radicle attached to the nitrogen in the amines to be used for our process seems to be indifferent as far as the condensation with a plurality of molecular proportions of aldehyde is concerned, but it has an influence on the physical characteristics and other properties of the condensation products.

Some of the amines that have been tested and give satisfactory product are aniline, o-toluidine, n-butylamine, methylamine, ethylenediamine, o-tolyl-diguanide, ethylaniline, diethylamine, etc. Although secondary amines will react in the manner similar to the primary amines, we prefer condensation products obtained from the primary amines for certain uses for which these new products are applicable as mentioned below.

Among the aldehydes which are desirable for our purpose may be mentioned propionaldehyde, n-butyraldehyde, heptaldehyde, acet-aldol, crotonaldehyde, cinnamic aldehyde, etc. For certain purposes, as in the vulcanization of rubber products, we prefer the condensation products obtained from amino bodies and those aldehydes containing more than two carbon atoms in which the alpha and beta carbon atoms are linked by a single bond. For the purpose of this invention we will call this type of aldehyde bodies, alpha beta saturated aldehydes. Among the acids and acidic substances that may be used in these condensations are acetic, propionic, n- butyric, stearic, oleic, salicylic, picric, hydrochloric, phosphoric and sulfuric acids and substances displaying acidic properties in the presence of water, such as zinc chloride. Instead of the free acids or acidic substances amine salts may be used. For certain purposes the condensation products obtained in the presence of weak organic acids are to be preferred. The amount of acidic substances to be used depends upon the type of acidic substance, the aldehyde, and the amine, but should be kept below the equivalent amount of amine and is preferably about 0.2 molecular proportion of the amine.

We also consider as coming within the scope of our invention the use of potential acidic substances such as acid anhydrids, acid halides, etc., which may become acid or display acidic properties under the conditions of these condensations; i. e., in the presence of water. For the purpose of this invention we shall therefore construe as acidic condensing agents the above described types of substances.

It is well known that par-aldehydes and metaldehydes may be depolymerized to aldehydes by the action of heat or by a number of catalysts and we construe such polymerized aldehydes when used in our novel condensation process to be equivalent to the normal aldehydes.

We have found that the reaction products formed by our novel process are not homogeneous and the different constituent parts have different properties. If the process is carried out in the presence of acidic substances as described herein and as distinguished from the process described in copending application Serial No. 15,337, filed March 13, 1925, the proportion of the constituent parts is changed. In many instances we have found that the constituents less valuable for vulcanization acceleration form picrates. This test allows us to determine the relative amounts of the constituents contained in our novel condensation products, and in numerous cases the amount of constituent parts forming picrates is decreased in our novel products. The new condensation products show furthermore a decreased sensitivity to oxygen.

We have found that our new condensation products have remarkable properties which distinguish them from the well known equimolecular condensation products of aldehydes and amino bodies as well as from other aldehyde amine condensation products heretofore known. One use for our novel products is in the vulcanization of rubber substances. While amino bodies themselves and the equi-molecular condensation products are well known as accelerators, as are also condensation products of three molecular proportions of aldehydes with two molecular proportions of nitrogeneous bases, we find that by increasing the amount of aldehyde condensed with the amine above the proportions heretofore used, the curing power is not decreased but on the contrary increased gradually to a certain maximum, after which a slow decrease occurs. In numerous cases we find that the condensation products from one molecular proportion of amine and about twenty molecular proportions of aldehyde are just as strong, or even stronger than equimolecular condensation products. In the different series of aldehyde amine condensation products the maximum curing power is not always obtained in products having the same proportions of aldehyde and amine. The optimum proportion for this special use of our novel compounds depends upon the chemical composition of the compounds, but it is usually found when between two and seven molecular proportions of the aldehyde are allowed to react with one molecular proportion of the amine in the presence of an acidic substance.

Whereas we have found that the novel poly-aldehyde amine condensation products described in our application Serial No. 15,337, filed March 13, 1925, display a much weaker accelerating power when used in rubber compounds containing practical amounts of finely divided carbon, such as gas black, our novel condensation products have the technically very useful properties of being indifferent to the presence of such finely divided carbon in the rubber compounds to which they might be added.

As an example of our preferred type of products, we may mention the normal-butyraldehyde condensation products with aniline. These products are readily prepared by adding the amine to the aldehyde containing the acid or acidic substance, in the molecular proportions desired and effecting the condensation and elimination of water. As the amount of acid is increased, the speed of the reaction is increased and the time required for condensation is decreased. The ratio of molecular proportions of aldehyde and amine used may be varied as described above but the presence of acid continues to exert its beneficial effect.

It will be understood that our invention is not limited to any particular manipulation in effecting the reaction. For example, the condensation may be carried out in the presence of suitable inert solvents which may be later eliminated if desired; likewise the water of condensation may be removed by means of appropriate dehydrating agents. The operation may be otherwise modified in various respects without departing from our invention.

We do not wish to be limited by the manner of mixing the reacting substances from which we derive our new condensation products. For example, the condensation agents may be added to the reaction mixture after the addition of the aldehyde to the amine or it may be contained in either the aldehyde or amine or both, or the amine salt may be treated with the aldehyde, etc. The acidic condensing agent may be left in the final condensation product or may be removed by suitable means as the use of the product may dictate.

The speed of reaction is dependent upon the amount and kind of condensing agent used. It is likewise dependent upon the temperature maintained during condensation, which is usually limited by the boiling point at atmospheric pressure of one or all of the reacting substances. It is obvious that this temperature can be increased by effecting the reaction at super atmospheric pressures.

In most cases the reaction is highly exothermic and in some cases at least a satisfactory condensation product may be obtained without the application of external heat.

In order to illustrate our invention, the following table is included. In each case one molecular proportion of aniline has been caused to react with five molecular proportions of normal-butyraldehyde in the presence of different molecular proportions of n-butyric acid. The method of condensation and procedure in each case has been substantially the same.

| Mols of acid | Hours of heating required for condensation | Final temperature reached in condensation |
|---|---|---|
| 0.0 | 24.25 | 165° C. |
| 0.05 | 6.25 | 160° C. |
| 0.075 | 4.33 | 162° C. |
| 0.15 | 3.5 | 162° C. |

As a further illustration of our invention, the following examples are given. The first four examples are those included in the table.

*Example 1.*—36 parts of n-butyraldehyde, rendered acid free by treatment with dilute aqueous solution of sodium hydroxide and subsequent careful washing with water, were added to 9.3 parts aniline, that is to say in the proportion of five molecules of normal-butyraldehyde to one molecule of aniline. A vigorous reaction ensued, heat was evolved, water was formed and separated from the reaction mixture. The mixture was then heated at reflux. The reflux condenser was arranged to separate the water and to return the other refluxing substances to the reaction vessel. The mixture was refluxed on successive days for a total of 24.25 hours. After the mixture had been refluxed for this period of time there was no apparent increase in the amount of water formed and the reaction product had reached the temperature of 165° C. The resulting product was a light reddish brown, quite mobile liquid having a characteristic odor. It was insoluble in water but was easily soluble in alcohol, benzene and other organic solvents. When used in a compound composed of 100 parts of rubber, 3 parts of sulfur, 5 parts of zinc oxide, 25 parts of gas black and 1.0 part of this product, it produced a tensile strength of 1710 lbs./inch$^2$ when vulcanized at a temperature of 140° C. for 30 minutes.

*Example 2.*—36 parts of n-butyraldehyde and 0.44 parts of n-butyric acid were added to 9.03 parts of aniline, that is to say in the ratio of 5 molecular proportions of n-butyraldehyde and 0.05 mol. proportions of n-butyric acid to 1 mol. proportion of aniline. A vigorous reaction ensued, considerable heat was evolved, water was formed and separated from the reaction mixture. The mixture was heated immediately at reflux. The reflux condenser was so arranged as to allow a separation of water and only the refluxing n-butyraldehyde and other refluxing products were returned to the reaction vessel. After the reaction mixture had been refluxed for a total of 6.25 hours there was no apparent increase in the amount of water formed and the reaction product had reached a temperature of 160° C. The resulting product was a light reddish brown, quite mobile liquid, having a characteristic odor. It was insoluble in water but was easily soluble in alcohol, benzene and other organic solvents. When used in a compound composed of 100 parts of rubber, 3 parts of sulfur, 5 parts of zinc oxide, 25 parts of gas black and 1.0 part of this product it produced a tensile strength of 3440 lbs./inch$^2$ when vulcanized at a temperature of 140° C. for 30 minutes.

*Example 3.*—54 parts of n-butyraldehyde and 0.99 parts of normal butyric acid were added to 13.95 parts of aniline, that is to say, in the ratio of 5 mol. proportions of n-butyraldehyde and 0.075 mol. proportions of n-butyric acid to 1 mol. proportion of aniline. A vigorous reaction ensued, considerable heat was evolved, water was formed and separated from the reaction mixture. The mixture was heated immediately at reflux for 4.33 hours in the same manner as described in Example No. 2. At the end of this time there was no apparent increase in the amount of water formed and the reaction product had reached the temperature of 162° C. The resulting product was a light reddish brown, quite mobile liquid, having a characteristic odor. It was insoluble in water, but was easily soluble in alcohol, benzene and other organic solvents. When used in a compound composed of 100 parts of rubber, 3 parts of sulfur, 5 parts of zinc oxide, 25 parts of gas black and 1 part of this product it produced a tensile strength of 3625 lbs./inch$^2$ when vulcanized at a temperature of 140° C. for 30 minutes.

*Example 4.*—51.4 parts n-butyraldehyde and 1.89 parts of n-butyric acid were added to 13.3 parts of aniline, that is to say, in the ratio of 5 mol. proportions of n-butyraldehyde and 0.15 mol. proportions of n-butyric acid to 1 mol. proportion of aniline. The reaction proceeded as in Example 2 and after 3.5 hours of heating at reflux there was no apparent increase of the amount of water formed and the reaction mixture had reached a temperature of 162° C. The resulting product was a light reddish brown, quite mobile liquid having a characteristic odor. It was insoluble in water, but was easily soluble in alcohol, benzene and other organic solvents. When used in a compound composed of 100 parts of rubber, 3 parts of sulfur, 5 parts of zinc oxide, 25 parts of gas black and 1 part of this product, it produced a tensile strength of 4470 lbs./inch$^2$ when vulcanized at a temperature of 140° C. for 30 minutes.

*Example 5.*—10.02 parts of sulfuric acid (95% acidity) were added to 18.6 parts of aniline. This was in the ratio of one equivalent or 0.5 molecular proportion of sulfuric acid to one molecular proportion of aniline. To the resulting solid product, 72 parts, which is 5 molecular proportions, of n-butyraldehyde were added. The reaction was quite vigorous but it was necessary to apply heat to bring all of the aniline sulfate into solution. The mixture became quite viscous, turned red and became darker as the heating was continued. Heating was continued for three hours at a temperature which was never above 102° C. At the end of this time there was no apparent increase in the amount of water liberated. The resulting product was very viscous while warm and was practically a semi solid when cold. It was a deep cherry red in color and had a pleasant odor, somewhat like that of ripe apples. It was insoluble in water but was soluble in alcohol, benzene and other organic solvents.

*Example 6.*—72 parts of n-butyraldehyde and 56.8 parts of stearic acid were added to 18.6 parts of aniline. This was in the ratio of five molecular proportions of n-butyraldehyde, one molecular proportion of stearic acid and one molecular proportion of aniline. The heating process was then carried out as in Example 2 for 1.17 hours. At the end of this time there was no apparent increase in the amount of water formed and the reaction mixture had reached a temperature of 165° C. The resulting product was an orange red, mushy, semi-solid material, with a characteristic but not unpleasant odor. It was insoluble in water but was soluble in alcohol, benzene, and other organic solvents.

*Example 7.*—180 parts of n-butyraldehyde and 3.49 parts of n-butyric acid were added to 46.5 parts of aniline. This was in the ratio of five molecular proportions of n-butyraldehyde, 0.15 molecular proportion of n-butyric acid and one molecular proportion of aniline. The mixture was stirred mechanically and heated at reflux. The reflux condenser was arranged to separate the water and return all other refluxing material to the reaction vessel. At the end of 36 minutes the mixture had reached a temperature of 90° C. The uncondensed aldehyde was then distilled out. This distillation required 18 minutes and 53.9 parts (about 1.5 molecular proportions) of n-butyraldehyde were recovered. The mixture was then held at 120° C. for 20 minutes. The total time required for the condensation was 74 minutes. The resulting product was a light orange-red, quite mobile liquid having a characteristic odor. It was insoluble in water but was soluble in alcohol, benzene and other organic solvents. When used in a compound composed of 100 parts of rubber, 3 parts of sulfur, 5 parts of zinc oxide, 25 parts of gas black and 1 part of this product, it produced a tensile strength of 4965 lbs./inch$^2$ when vulcanized at a temperature of 140° C. for 30 minutes.

*Example 8.*—120 parts of n-butyraldehyde and 3 parts of acetic acid were added to 31 parts of aniline. This was in the ratio of 5 molecular proportions of n-butyraldehyde, 0.15 molecular proportion of acetic acid and one molecular proportion of aniline. The condensation was carried out as in Example 7. At the end of 31 minutes the mixture had reached a temperature of 90° C. and the uncondensed aldehyde was distilled out. This required 24 minutes and 1.43 molecular proportions were recovered. The mixture was then held at 120° C. for 10 minutes. The resulting product was a light orange, quite mobile liquid having a characteristic odor. It was insoluble in water but was easily soluble in alcohol, benzene and other organic solvents.

*Example 9.*—90 parts of n-butyraldehyde and 2.9 parts of n-butyric acid were added to 26.75 parts of o-toluidine. This was in the ratio of 5 molecular proportions of n-butyraldehyde, 0.15 molecular proportion of n-butyric acid and one molecular proportion of o-toluidine. A reaction ensued, heat was evolved and water separated from the reacting mixture. The condensation was carried out as in Example 7. At the end of 30 minutes the mixture had reached a temperature of 90° C. and the uncondensed aldehyde was distilled out. This required 21 minutes and 1.8 molecular proportions of n-butyraldehyde were recovered. The mixture was held at 120° C. for 10 minutes. The resulting product was an orange-red, quite mobile liquid with a characteristic odor. It was insoluble in water but was easily soluble in alcohol, benzene and other organic solvents.

*Example 10.*—72 parts of n-butyraldehyde and 4.69 parts of n-butyric acid were added to 31 parts of aniline. This was in the proportion of three molecular proportions of n-butyraldehyde, 0.15 molecular proportion of n-butyric acid and one molecular proportion of aniline. A vigorous reaction ensued, heat was evolved and water separated from the reacting mixture. The mixture was heated at reflux and stirred mechanically. The reflux condenser permitted the removal of water and the other refluxing materials were returned to the reaction vessel. At the end of 30 minutes the mixture had reached a temperature of 120° C. At this point an attempt to recover any uncondensed aldehyde by distillation yielded only a very small amount. The mixture was held at 120° C. for 15 minutes. The resulting product was a light orange colored liquid of about the mobility of aniline. It had a characteristic odor, was insoluble in water but was soluble in alcohol, benzene and other organic solvents. When used in a compound composed of 100 parts of rubber, 3 parts of sulfur, 5 parts of zinc oxide, 25 parts of gas black and one part of this product it produced a tensile strength of 2710 lbs./inch$^2$ when vulcanized at a temperature of 140° C. for 30 minutes.

*Example 11.*—48.9 parts of heptaldehyde and 2.18 parts of n-valeric acid were added to 10.43 parts of n-butylamine. This was in the ratio of 3 molecular proportions of heptaldehyde, 0.15 molecular proportion of n-valeric acid and one molecular proportion of n-butylamine. A very vigorous reaction ensued, heat was evolved and water separated from the reaction mixture. As the reaction became less vigorous the mixture was heated at reflux, the water being separated and the other refluxing materials being returned to the reaction vessel. At the end of 35 minutes there was no apparent increase in the amount of water formed and the temperature had reached 170° C. The resulting product was a light reddish brown, slightly viscous liquid having a characteristic odor. It was insoluble in water but was easily soluble in alcohol, benzene and other organic solvents.

We claim:

1. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of an amino body upon two or more molecular proportions of an aldehyde containing more than two carbon atoms in the molecule and which products are yellowish to brown liquids or amorphous semi-solid or solid substances.

2. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of an amino body upon from two to twenty molecular proportions of an aldehyde containing more than two carbon atoms in the molecule and which products are yellowish to brown liquids or amorphous semi-solid or solid substances.

3. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of an amino body upon from two to seven molecular proportions of an aldehyde containing more than two carbon atoms in the molecule and which products are yellowish to brown liquids or amorphous semi-solid or solid substances.

4. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of a primary amine upon two or more molecular proportions of an aldehyde containing more than two carbon atoms in the molecule and which products are yellowish to brown liquids or amorphous semi-solid or solid substances.

5. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of a primary amine upon from two to twenty molecular proportions of an aldehyde containing more than two carbon atoms in the molecule and which products are yellowish to brown liquids or amorphous semi-solid or solid substances.

6. As new compositions of matter, the aldehyde amine condensation products which are substantially identical with the condensation products obtained by reacting in the presence of an acidic substance and under conditions whereby water is eliminated from the reaction mixture during the condensation reaction, with one molecular proportion of a primary amine upon from two to seven molecular proportions of an aldehyde containing more than two carbon atoms in the molecule and which products are yellowish to brown liquids or amorphous semi-solid or solid substances.

7. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of an amino body upon two or more molecular proportions of an aldehyde containing more than two carbon atoms in the molecule and which products are yellowish to brown liquids or amorphous semi-solid or solid substances.

8. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of an amino body upon two to twenty molecular proportions of an aldehyde containing more than two carbon atoms in the molecule and which products are yellowish to brown liquids or amorphous semi-solid or solid substances.

9. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of an amino body upon two to seven molecular proportions of an aldehyde containing more than two carbon atoms in the molecule and which products are yellowish to brown liquids or amorphous semi-solid or solid substances.

10. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of a primary amine upon two or more molecular proportions of an aldehyde containing more than two carbon atoms in the molecule and which products are yellowish to brown liquids or amorphous semi-solid or solid substances.

11. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of a primary amine upon two to twenty molecular proportions of an aldehyde containing more than two carbon atoms in the molecule and which products are yellowish to brown liquids or amorphous semi-solid or solid substances.

12. As new compositions of matter, the aldehyde amine condensation products which are substantially identical with the condensation products obtained by reacting in the presence of an acid and under conditions whereby water is eliminated from the reaction mixture during the condensation reaction, with one molecular proportion of a primary amine upon two to seven molecular proportions of an aldehyde containing more than two carbon atoms in the molecule and which products are yellowish to brown liquids or amorphous semi-solid or solid substances.

13. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an amino body upon two or more molecular proportions of an aldehyde containing more than two carbon atoms in the molecule and which products are yellowish to brown liquids or amorphous semi-solid or solid substances.

14. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an amino body upon two to twenty molecular proportions of an aldehyde containing more than two carbon atoms in the molecule and which products are yellowish to brown liquids or amorphous semi-solid or solid substances.

15. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an amino body upon two to seven molecular proportions of an aldehyde containing more than two carbon atoms in the molecule and which products are yellowish to brown liquids or amorphous semi-solid or solid substances.

16. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of a primary amine upon two or more molecular proportions of an aldehyde containing more than two carbon atoms in the molecule and which products are yellowish to brown liquids or amorphous semi-solid or solid substances.

17. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of a primary amine upon two to twenty molecular proportions of an aldehyde containing more than two carbon atoms in the molecule and which products are yellowish to brown liquids or amorphous semi-solid or solid substances.

18. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of a primary amine upon two to seven molecular proportions of an aldehyde containing more than two carbon atoms in the molecule and which products are yellowish to brown liquids or amorphous semi-solid or solid substances.

19. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an aromatic amine upon two or more molecular proportions of an aldehyde containing more than two carbon atoms in the molecule and which products are yellowish to brown liquids or amorphous semi-solid or solid substances.

20. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an aromatic amine upon two to twenty molecular proportions of an aldehyde containing more than two carbon atoms in the molecule and which products are yellowish to brown liquids or amorphous semi-solid or solid substances.

21. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of an aromatic amine upon two to seven molecular proportions of an aldehyde containing more than two carbon atoms in the molecule and which products are yellowish to brown liquids or amorphous semi-solid or solid substances.

22. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of aniline upon two or more molecular proportions of butyraldehyde and which products are yellowish to brown liquids or amorphous semi-solid or solid substances.

23. As new compositions of matter, the aldehyde amine condensation products which are substantially identical with the condensation products obtained by reacting in the presence of an organic acid and under conditions whereby water is eliminated from the reaction mixture during the condensation reaction, with one molecular proportion of aniline upon two to twenty molecular proportions of butyraldehyde and which products are yellowish to brown liquids or amorphous semi-solid or solid substances.

24. As new compositions of matter, the aldehyde amine condensation products which are substantially identical with the condensation products obtained by reacting in the present of an organic acid and under conditions whereby water is eliminated from the reaction mixture during the condensation reaction, with one molecular proportion of aniline upon two to seven molecular proportions of butyraldehyde and which products are yellowish to brown liquids or amorphous semi-solid or solid substances.

25. Process for the production of condensation products of aldehydes and amino bodies in which the molecular ratio of aldehyde to amine is greater than 2 to 1, which comprises causing one molecular proportion of an amino body to react directly with at least three molecular proportions of an aldehyde having more than two carbon atoms in its molecule in the presence of an acidic condensing agent and under conditions whereby water is eliminated from the reaction mixture during the condensation reaction.

26. Process for the production of condensation products of aldehydes and amino bodies in which the molecular ratio of aldehyde to amine is greater than 2 to 1, which comprises causing one molecular proportion of a primary amine to react directly with at least three molecular proportions of an aliphatic aldehyde having more than two carbon atoms in its molecule in the presence of an acid and under conditions whereby water is eliminated from the reaction mixture during the condensation reaction.

27. Process for the production of condensation products of aldehydes and amino bodies in which the molecular ratio of aldehyde to amine is greater than 2 to 1, which comprises causing one molecular proportion of a primary amine to react directly with at least three molecular proportions of an aliphatic aldehyde having more than two carbon atoms in its molecule in the presence of an organic acid and under conditions whereby water is eliminated from the reaction mixture during the condensation reaction.

28. Process for the production of condensation products of aldehydes and amino bodies in which the molecular ratio of aldehyde to amine is greater than 2 to 1, which comprises causing one molecular proportion of a primary amine to react directly with from 3 to 7 molecular proportions of an aliphatic aldehyde having more than two carbon atoms in its molecule in the presence of an organic acid and under conditions whereby water is eliminated from the reaction mixture during the condensation reaction.

29. Process for the production of condensation products of aldehydes and amino bodies in which the molecular ratio of aldehyde to amine is greater than 2 to 1, which comprises causing one molecular proportion of a primary amine to react directly with about five molecular proportions of an alpha-beta saturated aldehyde in the presence of an organic acid and under conditions whereby water is eliminated from the reaction mixture during the condensation reaction.

30. Process for the production of condensation products of aldehydes and amino bodies in which the molecular ratio of aldehyde to amine is greater than 2 to 1, which comprises causing one molecular proportion of a primary amine to react directly with about five molecular proportions of butyraldehyde in the presence of an organic acid and under conditions whereby water is eliminated from the reaction mixture during the condensation reaction.

31. Process for the production of condensation products of aldehydes and amino bodies in which the molecular ratio of aldehyde to amine is greater than 2 to 1, which comprises causing one molecular proportion of aniline to react directly with about five molecular proportions of butyraldehyde in the presence of an organic acid and under conditions whereby water is eliminated from the reaction mixture during the condensation reaction.

In testimony whereof we have hereunto set our hands.

WALDO BRIGGS BURNETT.
IRA WILLIAMS.